UNITED STATES PATENT OFFICE.

ALEXANDER McKECHNIE, OF BIRMINGHAM, ENGLAND.

METHOD OF SEPARATING NICKEL.

1,381,720.    Specification of Letters Patent.    Patented June 14, 1921.

No Drawing.    Application filed May 3, 1920. Serial No. 378,537.

*To all whom it may concern:*

Be it known that I, ALEXANDER McKECHNIE, subject of the King of Great Britain, and resident of Birmingham, England, have invented certain new and useful Methods of Separating Nickel.

This invention has reference to the separation or recovery of nickel from cupro-nickel alloys or from scrap and other materials where the copper and nickel are present in a metallic state, and it consists in the method hereinafter described and claimed for effecting the separation of the nickel in an effective and economical manner.

According to one application of the invention to the separation of nickel from a cupro-nickel metallic alloy or scrap, the method consists in subjecting a molten charge of the material, in a basic reverberatory furnace, to heat with oxidizing treatment in order to effect the separation of the whole or a part of the nickel content by volatilization and its conversion into a fume or vapor of nickel oxid which can be carried over from the furnace, intercepted or collected, and reduced to metallic nickel by any known method.

According to one method of effecting this separation or recovery of nickel, a charge of alloy containing metallic nickel and copper is rapidly melted on the hearth of a basic reverberatory furnace and air is blown through the charge which is maintained in a molten condition by the continued application of heat; this simultaneous air and heat treatment assisted by the agitation set up in the mass by the blowing of air therethrough, resulting in a separation of the whole or a part of the nickel content by volatilization into a fume or vapor of nickel oxid. The said treatment is continued until the whole or a part of the nickel has been volatilized out from the charge, and the resultant oxid is carried over from the furnace and intercepted and recovered in condenser flues, bag-houses, or the like, or treated in electrical precipitators, or by any other convenient means for collecting the said oxid from which the metallic nickel is subsequently obtained by known methods of reduction.

Instead of blowing air through the molten charge, air may be blown onto the surface of the said charge.

Or instead of melting the charge in the basic furnace, the material to be dealt with may be introduced into the same in a molten condition and subjected to the heat and oxidization treatment above referred to.

Having described my invention, what I claim and desire to secure by Letters Patent is:—

1. A method of separating nickel from cupro-nickel alloy, or scrap or other material containing copper and nickel in the metallic state, in which the molten material is subjected to heat and oxidizing treatment in a basic reverberatory furnace; the treatment being continued until the whole or part of the nickel content is volatilized out or carried over from the furnace in the form of nickel oxid, which can be intercepted or collected and reduced to metallic nickel by any known method.

2. The method hereinafter described of separating nickel from cupro-nickel alloy, or scrap or other material containing copper and nickel in the metallic state, said method consisting, essentially, in rapidly reducing to a molten condition on the hearth of a suitable basic furnace, a charge of material containing metallic copper and nickel and subjecting the molten material to the action of an air current.

3. The method herein described of separating nickel from cupro-nickel alloy, or scrap or other material containing copper and nickel in the metallic state, said process consisting, essentially, in rapidly reducing the material to a molten condition and maintaining the material under heat, and at the same time blowing air through or onto the surface of the molten material.

4. An alternative method in which a molten charge of cupro-nickel material is bessemerized in a basic converter and the bessemerizing is continued until the whole or a part of the nickel has been volatilized out and carried over in as nickel oxid to condenser flues or the like arranged in connection with the converter.

Signed at Birmingham, England, this 22nd day of March, A. D. 1920.

ALEX. McKECHNIE.